Nov. 25, 1952 G. V. RYLSKY ET AL 2,619,572
ELECTRIC ALTIMETER
Filed July 2, 1948

INVENTORS
GREGORY V. RYLSKY
EDWARD P. ANDERSON
BY
-ATTORNEY-

Patented Nov. 25, 1952

2,619,572

UNITED STATES PATENT OFFICE 2,619,572

ELECTRIC ALTIMETER

Gregory V. Rylsky, Ridgefield Park, and Edward P. Anderson, Teaneck, N. J., assignors to Bendix Aviation Corporation, Teterboro, N. J., a corporation of Delaware Application July 2, 1948, Serial No. 36,704

9 Claims. (Cl. 201—63)

1

This invention relates to altimeters and more particularly to a means for measuring the density of a gas which is indicative in the case of aircraft, of the altitude of the craft.

An object of our present invention is to provide a tube or cell producing an electrical signal proportional to the density of the gas measured.

Another object of our invention is to provide a tube of the character indicated in which the changes in the density of the gas varies the resistance of a heated wire providing an electrical signal responsive to the density of the gas.

A further object of this invention is to provide a tube of the character indicated in which positional and/or accelerational errors are eliminated.

Still another object of the invention is to provide an altitude cell for use aboard aircraft in which the changes in the air density as altitude varies produces an electrical signal which is responsive to the altitude of the aircraft.

Still a further object of our invention is to provide a novel tube of the character indicated which shall consist of few and simple parts, relatively inexpensive to manufacture, positive and accurate in its operation, which shall have a large variety of application, and yet be practical and efficient to a high degree in use.

Other objects of the invention will in part be obvious, and in part hereinafter pointed out.

Figure 1:
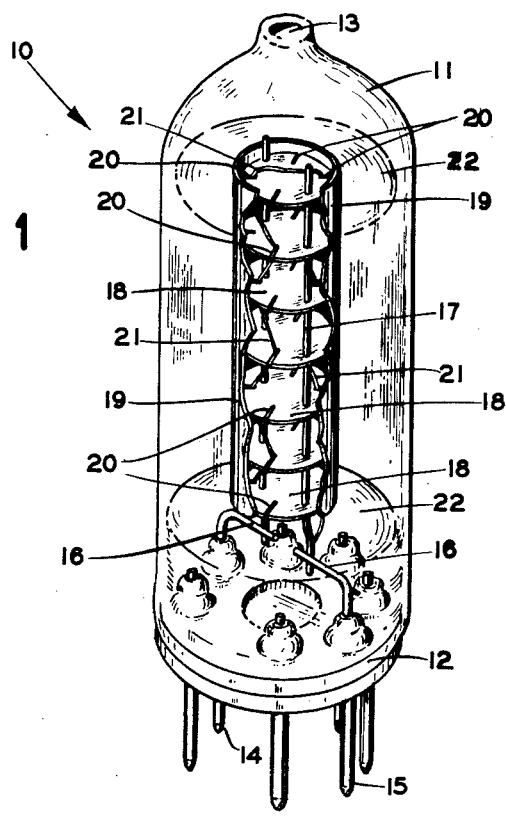
Figure 2:
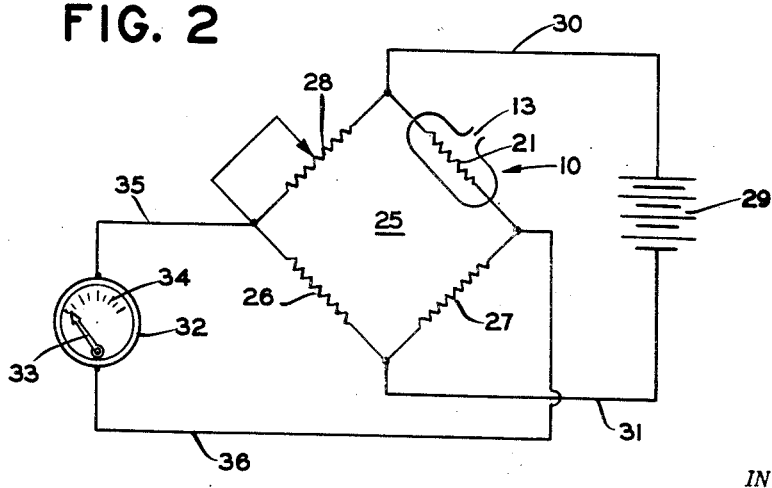

In the accompanying drawings forming a part of this specification in which one of the various possible illustrative embodiments of our invention is shown, Fig. 1 is a perspective view of our altitude cell, while Fig. 2 is a schematic wiring diagram illustrating the cell connected into a circuit for indicating the altitude.

In the drawings, the numeral 10 designates a tube incorporating our invention comprising a bulb 11 sealed to a conventional seven pin miniature base 12, the tube 11 being vented at the top as at 13 for the purpose hereinafter appearing. Fixed to the diametrically opposed pins 14 and 15 of the base and within the tube 11 are two horizontal supporting rods 16. Integral with said rods are two standards 17 supporting a plurality of equally spaced ceramic discs 18 inclosed by a tubular shield or sleeve 19. The discs 18 are provided with four equally spaced radial slots 20, two diametrically opposed slots of each disc having a fine filament 21 preferably of nickel, threaded therethrough. It will be noted that the slots 20 of the discs 18 are in vertical alignment, and that the filament 21 is threaded through alternate slots

2 of each succeeding disc and over the top disc; the ends of the filament being connected to the pins 14 and 15. Two ceramic discs 22, fixed to the upper and lower ends of the tubular shield 19 for centering the same, complete the tube assembly.

The tube 11 is connected into a bridge circuit 25 by means of a suitable seven pin receptacle (not shown) and forms one arm thereof. The bridge circuit 25 further comprises the two resistors 26 and 27 and the variable resistor 28. A battery 29 is connected by leads 30 and 31 across the diagonals of the bridge, while a meter 32, having a pointer 33 and a calibrated dial 34, is connected across the opposite diagonals by the leads 35 and 36.

The filament 21 of the tube will be heated by the current passing therethrough. The air will enter the tube 11 through the vent 13 of the bulb and into the sleeve 19 through the slots 20 of the discs. The heat generated in the tube will be dissipated by the heat conductivity of the surrounding air and by radiation. As the altitude increases, the density of the air will decrease. The temperature of the filament will vary with the changes in air density due to the changes in the heat conductivity of the air. By adjusting the variable resistor 28 of the bridge 25 so that a zero reading is obtained on the meter 32 at sea level, the change in the resistance of the filament 21 due to the changes in temperature thereof will provide an unbalanced condition of the bridge to indicate the altitude.

It will be appreciated that the method of mounting the filament 21 in a plurality of chambers or cells formed by the discs 18 and sleeve 19 will prevent positional or accelerational errors. Since the heated filament 21 passes through a chain of very small compartments formed by the sleeve 19 and discs 18, the close proximity of the compartment or cell walls together with the usual occluded air eliminates the convection currents heretofore had in tubes of this type. Since no convection currents exist within the tube, any extraneous forces applied to the tube will not affect the cooling rate (or resistance) of the hot filament. The overall resistance of the filament 21 is therefore a true measure of the altitude.

While we have illustrated a bridge circuit wherein one arm is formed by a tube 10, it will be appreciated that two, three or all four arms may be composed of tubes 10, depending upon the function required.

It will thus be seen that there is provided a novel tube in which the several objects of this invention are achieved and which is well adapted to meet the conditions of practical use. While the above embodiment has been described as an altimeter, it will be apparent that our novel tube may readily be used to measure the density of a gas flowing through a main or gas line.

As various possible embodiments might be made of the above invention, and as various changes may be made in the embodiment set forth above, it will be understood that all matter herein set forth, or shown in the accompanying drawing, is to be interpreted as illustrative, and not in a limiting sense.

Having thus described our invention, we claim as new and desire to secure by Letters Patent:

1. A tube comprising a vented envelope, a support within said envelope, a plurality of vented cells on said support to minimize convection currents within the envelope, discs at both ends of said support to center the same within the envelope, and a filament adapted to be heated threaded through said cells, the ends of said filament being adapted to be connected exteriorly of said tube in an electrical circuit.

2. A tube comprising an envelope, a base sealed to said envelope, said envelope being formed with at least one vent; a plurality of standards within the envelope, a plurality of vented cells to minimize convection currents in the envelope supported on said standards, discs on both ends of said standards to center the same within the envelope, and a filament adapted to be heated threaded through said cells, the ends of said filament passing through said base for connection into an electric circuit.

3. A tube comprising a base, an envelope sealed to said base, said envelope having a vent therein; a plurality of standards fixed in said base, a plurality of spaced discs on said standards, slots in said discs, a tubular sleeve fixed over said standards and said discs to form a plurality of vented cells between said discs to minimize convection currents within the envelope, and a filament adapted to be heated threaded through said slots and passing through said cells, the ends of the filament passing through said base for connection into an electric circuit.

4. A tube comprising a base, an envelope sealed to said base, said envelope having a vent therein; a plurality of standards fixed in said base, a plurality of spaced discs on said standards, slots in said discs, a tubular sleeve fixed over said standards and said discs to form a plurality of cells between said discs to minimize convection currents within the envelope, discs fixed to the end of said sleeve to center the same within the envelope, and a filament adapted to be heated threaded through said slots and passing through each of the cells formed, the ends of the filament passing through said base for connection into an electric circuit, said cells being in communication with one another and with said vent through said slots.

5. A tube comprising a base, an envelope sealed to said base, said envelope having a vent therein; a plurality of standards fixed to said base, a plurality of spaced discs on said standards, said discs being formed with a number of radial slots, the slots of said discs being in alignment; a filament adapted to be heated threaded through said slots passing from one slot of one disc to the adjoining slots of the succeeding disc, and a sleeve fixed over said standards and said discs forming vented cells between the discs to minimize convection currents within the envelope.

6. A tube comprising a base, an envelope sealed to said base, said envelope having a vent therein; a plurality of standards fixed to said base, a plurality of spaced discs on said standards, said discs being formed with a number of radial slots, the slots of said discs being in alignment; a filament adapted to be heated threaded through said slots passing from one slot of one disc to the adjoining slots of the succeeding disc, a sleeve fixed over said standards and said discs forming vented cells between the spaced discs, and discs to minimize convection currents within the envelope fixed to both ends of said sleeve to center the same within the envelope.

7. A tube comprising a base, an envelope sealed to said base, said envelope having a vent therein; a plurality of standards fixed to said base, a plurality of spaced discs on said standards, said discs being formed with a number of radial slots, the slots of said discs being in alignment; a filament adapted to be heated threaded through said slots passing from one slot of one disc to the adjoining slots of the succeeding disc, across the last disc and threaded through the slots on the opposite sides of said discs, the ends of said filament passing out of said base for connection into an electric circuit, a sleeve fixed over said standards and said discs and forming with said discs a plurality of vented cells to minimize convection currents within the envelope, and discs fixed to the ends of said sleeve to center the same within the envelope.

8. A tube for detecting a change in density of a gas, comprising a vented envelope for receiving the gas, a plurality of vented cells in said envelope to minimize convection currents therein, and a filament adapted to be heated threaded through said cells, said filament being adapted for connection in an electrical circuit and changing resistance with change in gas density.

9. A tube comprising an envelope having a vent therein, a plurality of standards extending into said envelope, a plurality of spaced discs on said standards, apertures in said discs, a sleeve surrounding said discs to form a plurality of vented cells between said discs to minimize convection currents within said envelope, and an element adapted to be heated threaded through said apertures and extending through said cells.

GREGORY V. RYLSKY.
EDWARD P. ANDERSON.

REFERENCES CITED

The following references are of record in the file of this patent:

UNITED STATES PATENTS

| Number | Name | Date |
| --- | --- | --- |
| 1,308,211 | Walder | July 1, 1919 |
| 1,715,287 | Head | May 28, 1929 |
| 1,993,063 | Klopsteg | Mar. 5, 1935 |
| 2,315,671 | Tawney | Apr. 6, 1943 |

FOREIGN PATENTS

| Number | Country | Date |
| --- | --- | --- |
| 241,940 | Switzerland | Apr. 15, 1946 |
| 595,749 | France | July 24, 1925 |